(12) United States Patent
Narita

(10) Patent No.: US 11,577,672 B2
(45) Date of Patent: Feb. 14, 2023

(54) GROMMET

(71) Applicant: NOK CORPORATION, Tokyo (JP)

(72) Inventor: Nobuhiko Narita, Tottori (JP)

(73) Assignee: NOK CORPORATION

( * ) Notice: Subject to any disclaimer, the term of this patent is extended or adjusted under 35 U.S.C. 154(b) by 288 days.

(21) Appl. No.: 16/633,459

(22) PCT Filed: Aug. 10, 2018

(86) PCT No.: PCT/JP2018/030014
§ 371 (c)(1),
(2) Date: Jan. 23, 2020

(87) PCT Pub. No.: WO2019/039310
PCT Pub. Date: Feb. 28, 2019

(65) Prior Publication Data
US 2020/0231101 A1    Jul. 23, 2020

(30) Foreign Application Priority Data

Aug. 24, 2017 (JP) .............................. JP2017-160729

(51) Int. Cl.
*B60R 16/02* (2006.01)
*F16F 15/08* (2006.01)

(52) U.S. Cl.
CPC .......... *B60R 16/0222* (2013.01); *F16F 15/08* (2013.01)

(58) Field of Classification Search
CPC .. B60R 16/0222; B60R 16/0206; F16F 15/08; F16F 15/3732; F16F 15/373
See application file for complete search history.

(56) References Cited

U.S. PATENT DOCUMENTS

| 4,138,812 A | 2/1979 | Zimmerer et al. |
| 4,807,335 A * | 2/1989 | Candea ............... F16B 19/1081 24/453 |

(Continued)

FOREIGN PATENT DOCUMENTS

| CN | 101415958 A | 4/2009 |
| CN | 101893023 A | 11/2010 |

(Continued)

OTHER PUBLICATIONS

Request for the Submission of an Opinion (including English translation) issued against the corresponding Korean Patent Application No. 10-2020-7005046 from the Korean Intellectual Property Office dated Nov. 3, 2022. (8 pages).

*Primary Examiner* — Paresh Paghadal
(74) *Attorney, Agent, or Firm* — Harness, Dickey & Pierce, P.L.C.

(57) ABSTRACT

A grommet is provided including a grommet body made of rubber-like elastic material and to be mounted on a mating component, and a center shaft configured to secure the grommet body on the mating component. The grommet body includes a cylindrical insertion portion to be inserted into a mounting hole formed on the mating component, a folded catcher formed on the leading end of the insertion portion, an umbrella-shaped head formed on the rear end of the insertion portion, and a groove-like release space defined on the inner circumferential surface of the insertion portion. The center shaft includes a shaft to be inserted into the inner circumference of the insertion portion, a folded catcher formed on the leading end of the shaft, and a head formed on the rear end of the shaft.

6 Claims, 6 Drawing Sheets

(56) References Cited

U.S. PATENT DOCUMENTS

| | | | | |
|---|---|---|---|---|
| 4,957,273 | A * | 9/1990 | Sears | F16K 31/02 361/203 |
| 5,155,303 | A * | 10/1992 | Bensel, III | G02B 6/4471 174/92 |
| 5,451,717 | A * | 9/1995 | Itou | H01R 13/5205 439/275 |
| 5,824,962 | A * | 10/1998 | Katsuma | H01R 13/5205 439/587 |
| 5,945,606 | A * | 8/1999 | Tokunaga | G01K 1/14 73/756 |
| 6,053,753 | A * | 4/2000 | Kunkle | H01R 13/5221 439/275 |
| 6,324,731 | B1 | 12/2001 | Pliml, Jr. | |
| 6,354,578 | B1 | 3/2002 | Nakatsukasa et al. | |
| 6,948,375 | B2 * | 9/2005 | Nomura | G01L 19/0007 73/756 |
| 2008/0128966 | A1 | 6/2008 | Tsai | |
| 2012/0102687 | A1 | 5/2012 | Hasegawa et al. | |
| 2012/0326369 | A1 | 12/2012 | Kawachi et al. | |
| 2014/0346719 | A1 | 11/2014 | Kaneko et al. | |
| 2015/0047147 | A1 * | 2/2015 | Vaccaro | F16L 3/137 16/2.1 |
| 2018/0231148 | A1 * | 8/2018 | Homem | H02G 3/088 |
| 2020/0132098 | A1 * | 4/2020 | Heinrich | F16B 5/025 |

FOREIGN PATENT DOCUMENTS

| | | |
|---|---|---|
| CN | 202883582 U | 4/2013 |
| JP | S54-133283 U | 9/1979 |
| JP | H06-280698 A | 10/1994 |
| JP | H08-232925 A | 9/1996 |
| JP | H10-26170 A | 1/1998 |
| JP | 2001-090779 A | 4/2001 |
| JP | 2003-074637 A | 3/2003 |
| JP | 2013-002614 A | 1/2013 |
| JP | 2014-228126 A | 12/2014 |
| JP | 2016-138564 A | 8/2016 |
| WO | WO-2012-056635 A1 | 5/2012 |

* cited by examiner

GROMMET

CROSS REFERENCE TO RELATED APPLICATIONS

This application is a U.S. National Phase application of International Application No. PCT/JP2018/030014, filed on Aug. 10, 2018 and published in Japanese as WO2019/039310A1 on Feb. 28, 2019 and claims priority to Japanese Patent Application No. 2017-160729, filed on Aug. 24, 2017. The entire disclosures of the above applications are expressly incorporated by reference herein.

BACKGROUND

Technical Field

The disclosure relates to a grommet.

Related Art

A grommet made of rubber-like elastic material is used to support various auxiliary devices, controllers, and electronic devices, including Antilock Brake System (ABS) and Engine Control Unit (ECU), mounted on vehicles, such as automobiles, such that these are protected from vibration.

As illustrated in FIG. 5, in general, a grommet 51 is formed into a cylindrical shape and to be mounted in a mounting hole 62 defined on a plate mating component 61. A grommet 51 has an annular fitting groove 52 formed on its outer circumferential surface, and is to be mounted on a mating component 61 in such a manner that the mounting hole circumferential edge 63 of the mating component 61 is fit in the fitting groove 52. The mating component 61 is mounted on a body, not illustrated, of a vehicle, for example, having a support body 81 attached thereto, with a mounting bolt 71 penetrating the grommet 51 and screwed into the support body 81. The grommet 51 is clamped between a plain washer 91 and the support body 81.

The grommet 51 illustrated in FIG. 5, for which a mounting bolt 71 is used as a fastening means, may be subjected to co-rotation due to rotation torque applied in fastening the bolt in some cases. If the grommet 51 is in co-rotation, torsion may be caused relative to the mating component 61, and latent existence of torsional stress can drop durability of the grommet 51. To address the above, a careful operation is required in mounting the grommet 51 so that torsion is not caused due to co-rotation. This leads to a concern that the mounting operation can end up complicated and troublesome.

The disclosure aims to prevent occurrence of torsion due to co-rotation in mounting operation.

SUMMARY

A grommet includes a grommet body made of rubber-like elastic material and a center shaft. The grommet body includes a cylindrical insertion portion to be inserted into a mounting hole formed on a mating component, a folded grommet catcher formed on the leading end of the insertion portion in the insertion direction, an umbrella-shaped grommet head formed on the rear end of the insertion portion in the insertion direction, the grommet head being configured to clamp the mating component in cooperation with the grommet catcher, and a release spatial portion constituting a groove-like release space on the inner circumferential surface of the insertion portion. The center shaft includes a shaft to be inserted into the inner circumference of the insertion portion, a folded shaft catcher formed on the leading end of the shaft in the insertion direction, and a shaft head formed on the rear end of the shaft in the insertion direction, the shaft head being configured to clamp the grommet body in cooperation with the shaft catcher.

Effect

According to the disclosure, use of a press-fit structure as a fastening means makes it possible to avoid rotation torque applied in mounting operation, which can prevent occurrence of torsion due to co-rotation.

DETAILED DESCRIPTION

Complete Structure of Grommet

Figure 1:
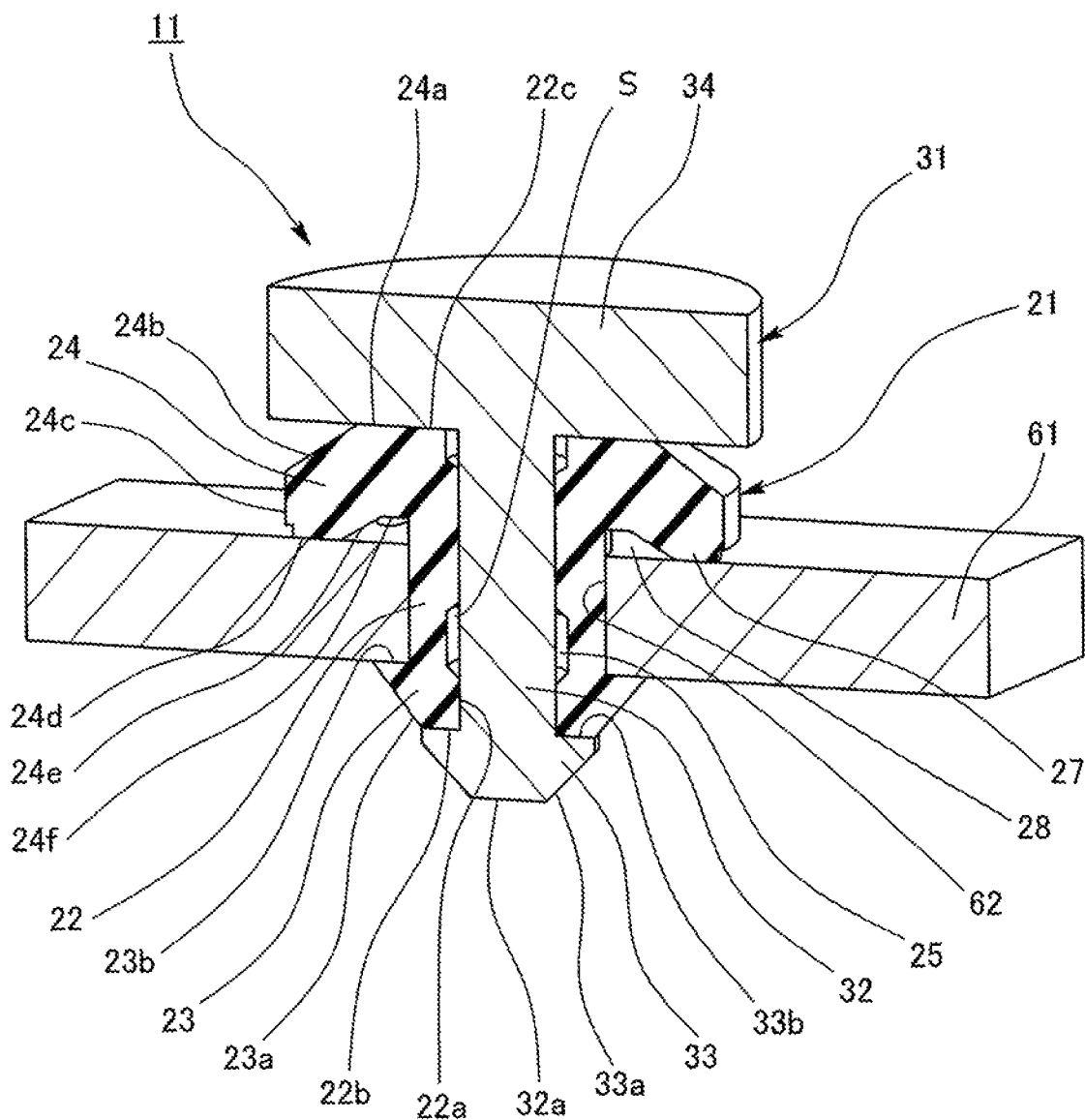
FIG. 1 is a cross sectional perspective view of a grommet in one embodiment of the disclosure.

As illustrated in FIG. 1 and FIG. 2, a grommet 11 in this embodiment includes a grommet body 21 made of rubber-like elastic material and a center shaft 31. The grommet body 21 is to be mounted on a plate mating component (a supported body) 61. The center shaft 31 serves to secure the grommet body 21 on the mating component 61 such that the grommet body 21 is not removed from the mating component 61. The grommet 11 is made of a combination of these components 21, 31.

Structure of Grommet Body

The grommet body 21 has a cylindrical insertion portion 22 to be inserted into a mounting hole 62 defined on the mating component 61. The insertion portion 22 has a folded grommet catcher 23 integrally formed on its leading end in the insertion direction (the lower end in the drawing) and an umbrella-shaped grommet head 24 integrally formed on its rear end in the insertion direction (the upper end in the drawing).

The cylindrical insertion portion 22 penetrates through the mating component 61 in the thickness direction of the mating component 61. The length of the insertion portion 22 is set larger than the thickness of the mating component 61. The outer diameter of the insertion portion 22 is set equal to or substantially equal to the inner diameter of the mounting hole 62 so that the insertion portion 22 will not bump in the diameter direction relative to the mounting hole 62. The insertion portion 22 has a through hole 22a formed along its central axis. The insertion portion 22 has an end face 22b on its leading end in the insertion direction and an end face 22c on its rear end in the insertion direction.

The folded grommet catcher 23 has a tapered insertion face 23a formed on the outer circumferential side of the end face 22b on the side of the leading end of the insertion portion 22, and a plane fitting face 23b formed on the rear end of the grommet catcher 23 in the insertion direction so as to be vertical to the axis of the insertion portion 22. The grommet catcher 23 of the grommet body 21 is an annular body defined by these faces 23a, 23b.

The direction of tapering of the insertion face 23a is such that the diameter becomes gradually smaller from the rear end toward the leading end in the insertion direction with a thinner leading end resulted. The inner diameter of the insertion face 23a is set smaller than the inner diameter of the mounting hole 62. The outer diameter of the insertion face 23a, or the outer diameter of the fitting face 23b, is set larger than the inner diameter of the mounting hole 62.

The umbrella-shaped grommet head 24 has a plane outer end face 24a vertical to its axis, a tapered outer slant surface 24b, a cylindrical outer circumferential surface 24c, a plane inner end face 24d vertical to its axis, a tapered inner slant surface 24e, and a plane inner end face 24f vertical to its axis. The outer end face 24a is formed on the outer circumferential side of the rear end face 22c of the insertion portion 22. The outer slant surface 24b is formed on the outer circumferential side of the outer end face 24a. The outer circumferential surface 24c is formed on the outer circumferential side of the outer slant surface 24b. The inner end face 24d is formed on the inner side relative to the outer circumferential surface 24c on the side of the leading end in the insertion direction. The inner slant surface 24e is formed on the inner circumferential side of the inner end face 24d. The inner end face 24f is formed on the further inner side relative to the inner slant surface 24e. The grommet head 24 of the grommet body 21 is an annular body defined by these faces 24a to 24f.

The direction of tapering of the outer slant surface 24b is such that the diameter becomes gradually larger from the rear end toward the leading end in the insertion direction. Similarly, the direction of tapering of the inner slant surface 24e is such that the diameter becomes gradually larger from the rear end toward the leading end in the insertion direction. The inner diameter and the outer diameter of the inner end face 24d are both set larger than the inner diameter of the mounting hole 62.

On the inner circumferential surface of the cylindrical insertion portion 22 on the inner circumferential side of the fitting face 23b of the folded grommet catcher 23, a release spatial portion 25, constituting an annular groove-like release space S, is defined. The release space S serves as a release area for the rubber-like elastic member to move thereinto when the folded grommet catcher 23 elastically deforms inward in the diameter direction.

Figure 2A:
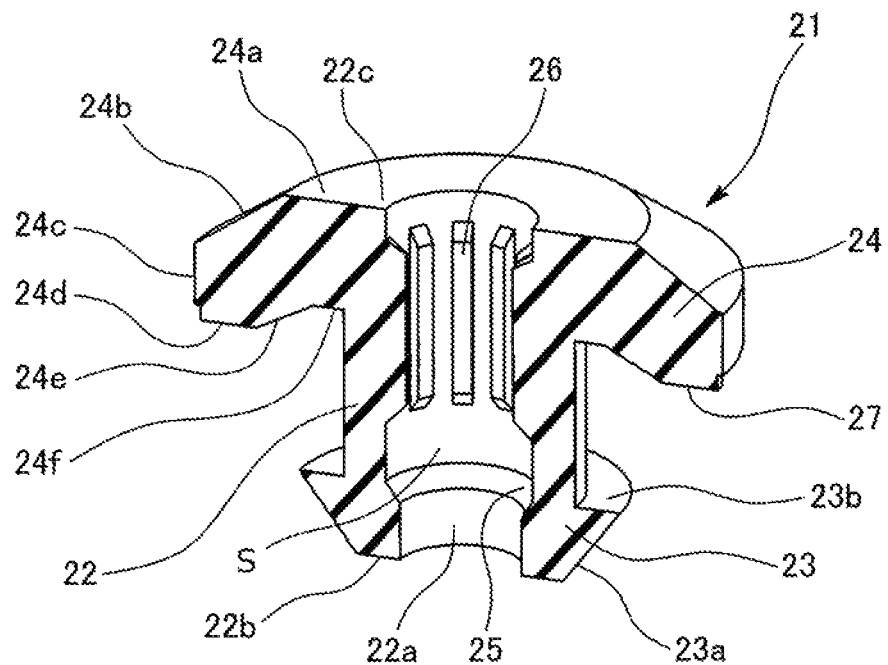
FIG. 2A and FIG. 2B are cross sectional perspective views of a grommet body of the grommet.
Figure 2B:
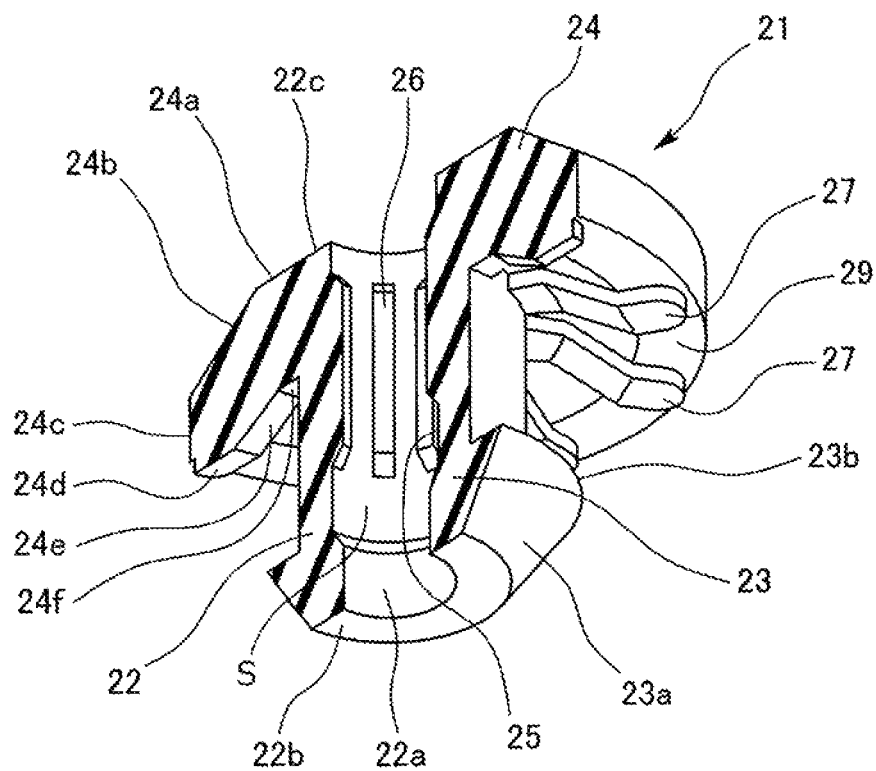

As illustrated in FIG. 2A and FIG. 2B, on the inner circumferential surface of the cylindrical insertion portion 22 on the inner circumferential side of the umbrella-shaped grommet head 24, a plurality of rib-like projections 26 are formed equidistantly along a circle so as to extend in the axial direction. The rib-like projections 26 guide the center shaft 31 being inserted (pressed) into the grommet body 21, and, after insertion, support the center shaft 31.

As illustrated in FIG. 2B, over the inner end face 24d, the inner slant surface 24e, and the inner end face 24f of the umbrella-shaped grommet head 24, a plurality of projections 27 are formed equidistantly along a circle. The projections 27 are in contact with the mating component 61 when the grommet body 21 is mounted. This leaves communication paths 29 formed between the adjacent projections 27, so that the inner space 28 (refer to FIG. 1) of the grommet head 24 is released to the outside air via the communication paths 29 when the grommet body 21 is mounted. The inner space 28 is an annular space surrounded by the grommet head 24, the insertion portion 22, and the mating component 61, and released to the outside air via the communication paths 29.

Structure of Center Shaft

As illustrated in FIG. 1, the center shaft 31 has a shaft 32 to be inserted into the inner circumference (the through hole 22a) of the insertion portion 22 of the grommet body 21. The shaft 32 has a folded shaft catcher 33 integrally formed on its leading end in the insertion direction and a disk shaft head 34 integrally formed on its rear end in the insertion direction.

The shaft 32 penetrates through the grommet body 21 in the height direction of the grommet body 21. The length of the shaft 32 is set longer than that of the grommet body 21 being mounted. The outer diameter of the shaft 32 is set equal or subsequently equal to the inner diameter (the inner diameter of the through hole 22a) so that the shaft 32 will not bump in the diameter direction relative to the inner circumference (the through hole 22a) of the insertion portion 22. The shaft 32 has an end face 32a on its leading end in the insertion direction.

The folded shaft catcher 33 includes a tapered insertion surface 33a formed on the outer circumferential side of the end face 32a of the shaft 32, and a plane fitting face 33b formed on the rear end of the shaft catcher 33 in the insertion direction so as to be vertical to its axis. The shaft catcher 33 of the center shaft 31 is an annular body defined by these faces 33a, 33b.

The direction of tapering of the insertion surface 33a is such that the diameter becomes gradually smaller from the rear end toward the leading end in the insertion direction with a thinner leading end resulted. The inner diameter of the insertion surface 33a is set smaller than the inner diameter (the inner diameter of the through hole 22a) of the insertion portion 22. The outer diameter of the insertion surface 33a, or the outer diameter of the fitting face 33b, is set larger than the inner diameter (the inner diameter of the through hole 22a) of the insertion portion 22.

The shaft head 34 of the center shaft 31 has a plate shape vertical to its axis, or a disk shape. Although the shaft head 34 is formed integral to the shaft 32, the shaft head 34 may be formed separately from the shaft 32 and connected to the shaft 32.

The center shaft 31 is made of resin or metal material harder than the rubber-like elastic material of which the grommet body 21 is made.

Figure 3A:
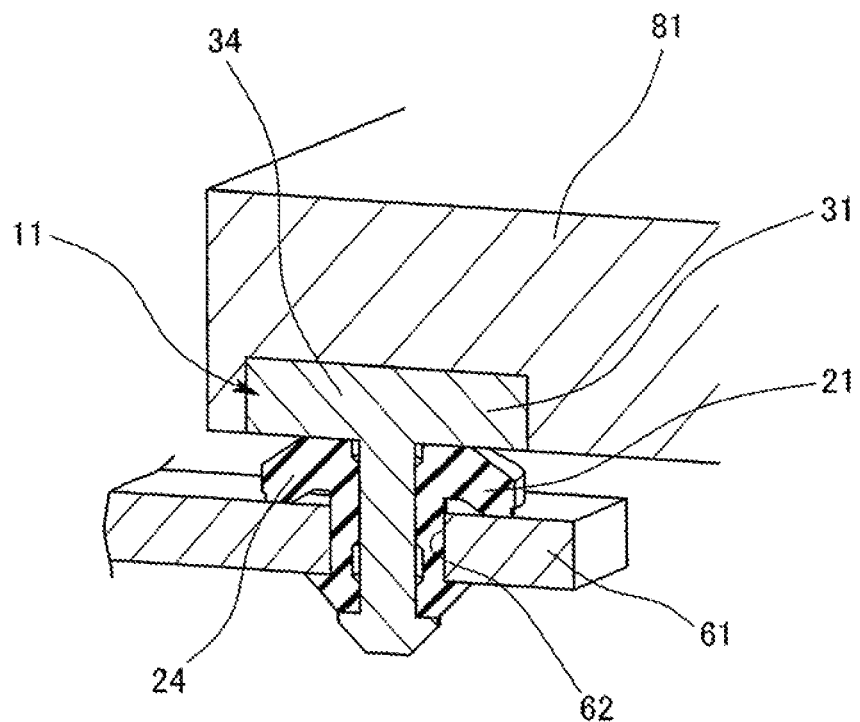
FIG. 3A is a cross sectional perspective view of a structure for mounting the grommet on a support body.

As illustrated in FIG. 3A, the center shaft 31 is connected to the support body 81, which supports the mating component 61, by securing (embedding) the shaft head 34 on the support body 81.

Steps for Mounting

Steps for mounting the grommet 11 on the mating component 61 will be described.

Step 1

Figure 4A:
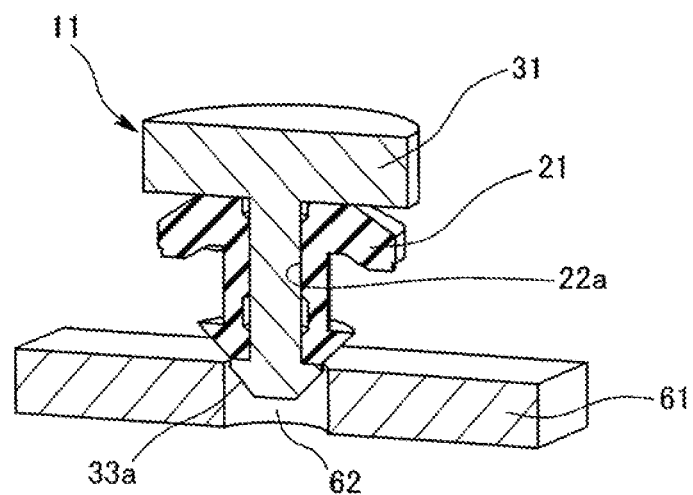
FIG. 4A, FIG. 4B, FIG. 4C, and FIG. 4D are cross sectional perspective views illustrating steps, in this order, of mounting the grommet on a mating component.

As illustrated in FIG. 4A, the center shaft 31 is inserted (pressed) into the grommet body 21. Specifically, the center shaft 31 to be inserted (pressed) into the through hole 22a of the grommet body 21 will smoothly penetrate through the through hole 22a thanks to the tapering of the insertion surface 33a on its leading end portion, while causing the grommet body 21 to deform such that the grommet body 21 spreads outward in the diameter direction.

Step 2

Figure 4B:
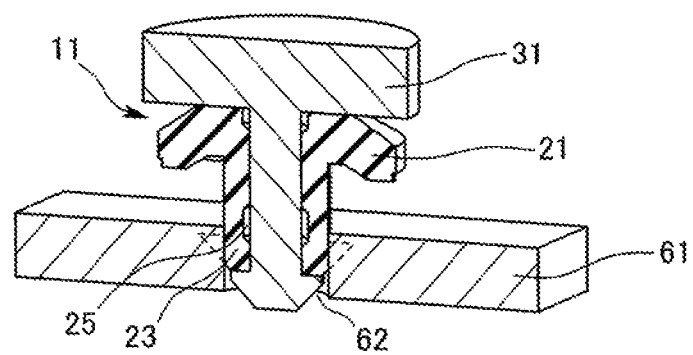

As illustrated in FIG. 4B, the entire grommet 11 is inserted (pressed) into the mounting hole 62 of the mating component 61. Specifically, as the folded grommet catcher 23 smoothly and elastically deforms inward in the diameter direction thanks to the release space S defined on the inner circumference of the grommet catcher 23. With the above, the grommet 11 can be readily pressed into the mounting hole 62.

Step 3

Figure 4C:
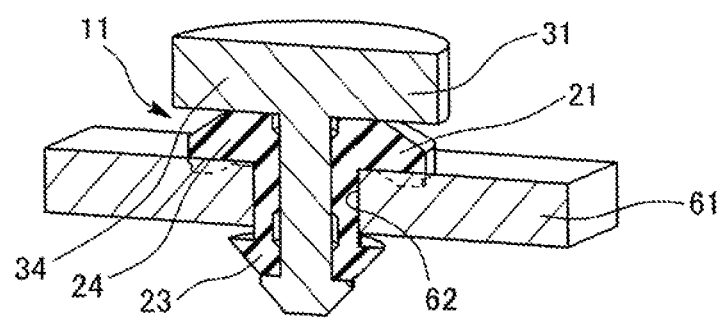

As illustrated in FIG. 4C, the grommet head 24 of the grommet body 21 is kept being pressed with the shaft head 34 of the center shaft 31, whereby the folded grommet catcher 23 is caused to fully penetrate through the mounting hole 62 of the mating component 61.

Step 4

Figure 4D:
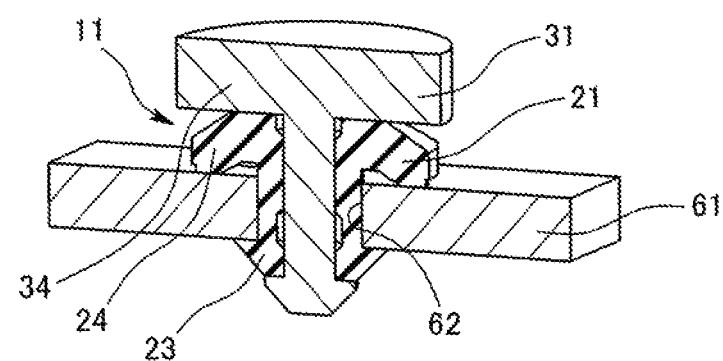
Figure 5:
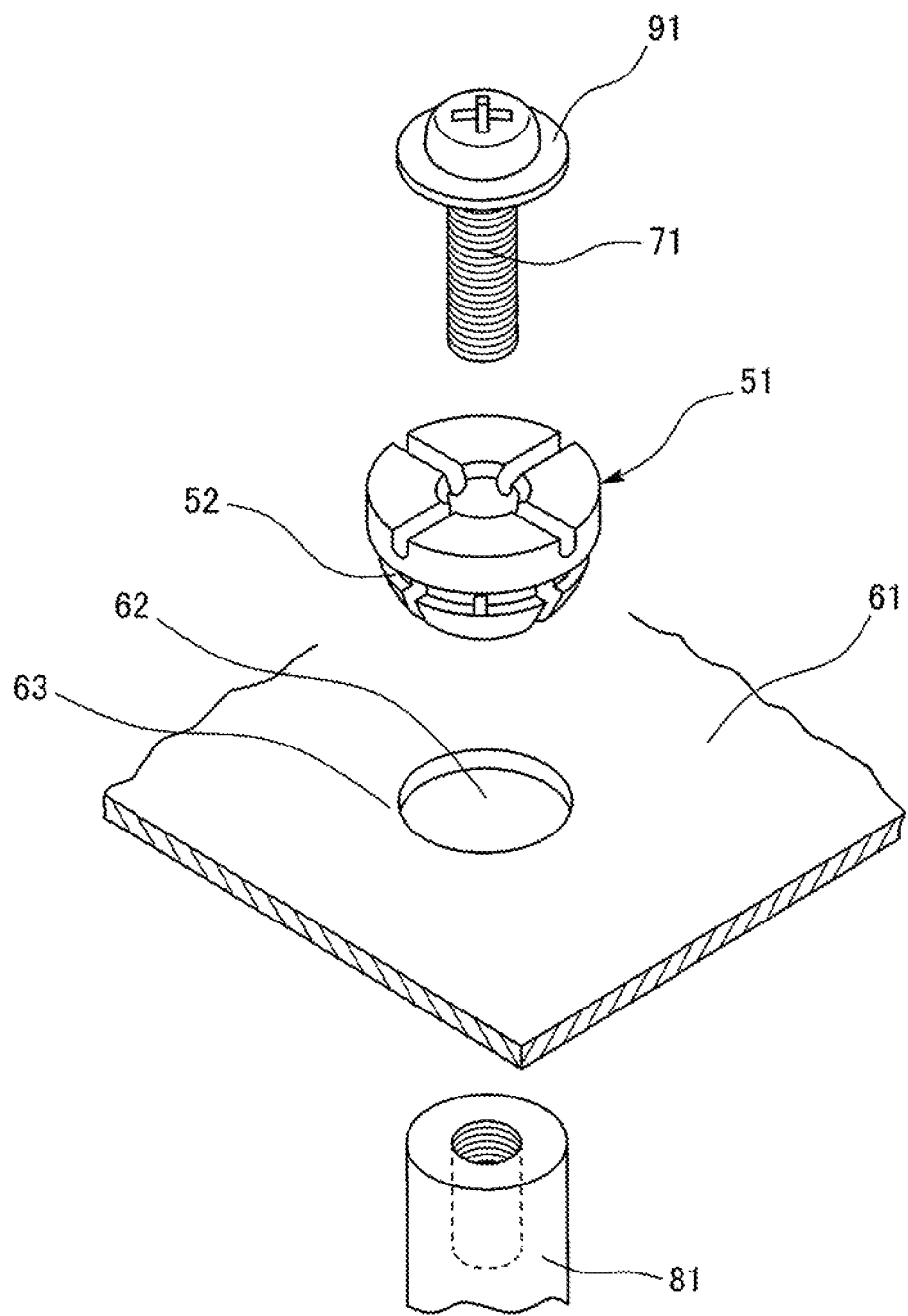
FIG. 5 is a diagram relevant to a grommet.

As illustrated in FIG. 4D, with the pressing load applied at above-described step 3 released, the grommet head 24 is elastically restored in the height direction until the grommet catcher 23 is fit against the circumferential edge of the opening of the mounting hole 62 to be thereby prevented from being removed. It is a concern that, without the communication path 29 on the grommet head 24, the grommet head 24 would be sucked to the mating component 61, like a sucking disk, and not be smoothly and elastically restored upon release of the pressing load applied at step 3. In this embodiment, as the communication paths 29, defined by the projections 27, are formed in the grommet head 24, the grommet head 24 can be prevented from being sucked to the mating component 61, like a sucking disk. The grommet head 24 can be smoothly and elastically restored.

Operation and Effect

The grommet 11 employs a structure that presses the grommet body 21 and the center shaft 31 for insertion, without using a mounting bolt, as a means for fastening a grommet. With this structure, as no rotation torque is applied to the grommet 11 when mounting the grommet 11, no torsion is caused due to co-rotation. Consequently, a grommet 11 superior in durability can be achieved. Further, a grommet fastening means having a pressing structure, without using a mounting bolt, makes it possible to mount the grommet 11 on the mating component 61 through only steps of sequential pressing of the grommet body 21 and the center shaft 31. This can facilitate an operation of mounting a grommet.

Figure 3B:
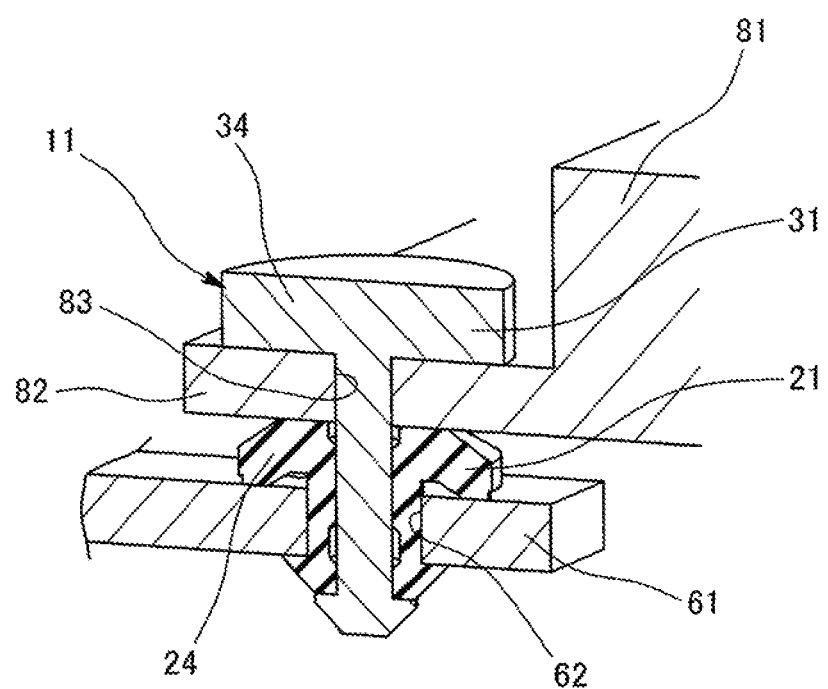
FIG. 3B is a cross sectional perspective view of another example of the structure.

In practice, various modifications and changes are applicable. For example, the structure for connecting the grommet 11 to the support body 81 may be such that the support body 81 is inserted into between the grommet head 24 of the grommet body 21 and the shaft head 34 of the center shaft 31, as illustrated in FIG. 3B, instead of a structure in which the shaft head 34 of the center shaft 31 is secured (embedded) relative to the support body 81 to thereby connect the grommet 11 to the support body 81, as illustrated in FIG. 3A. In the case where the structure illustrated in FIG. 3B is employed, the support body 81 is provided with a plate 82 for insertion into between the grommet head 24 and the shaft head 34, and a mounting hole 83 is formed on the plate 82.

INDUSTRIAL APPLICABILITY

A grommet according to the disclosure is used to support various auxiliary devices, controllers, and electronic devices mounted on vehicles, for example, automobiles, such that these are protected from vibration. In addition, the grommet is used in the fields of household appliances and electronic instruments, for example.

The invention claimed is:

1. A grommet, comprising:
a grommet body made of rubber-like elastic material, the grommet body including
a cylindrical insertion portion to be inserted into a mounting hole formed on a mating component, the insertion portion including a cylindrical outer surface and a through-hole extending along a longitudinal axis thereof that defines a cylindrical inner surface;
a folded grommet catcher formed on a leading end of the insertion portion in an insertion direction;
an umbrella-shaped grommet head formed on a rear end of the insertion portion in the insertion direction, the grommet head having a first planar inner end face that faces the grommet catcher and extends radially outward from the cylindrical outer surface of the cylindrical insertion portion, a tapered slant surface that faces the grommet catcher and extends radially outward from the first planar inner end face, and a second planar inner end face that faces the grommet catcher and extends radially outward from the tapered slant surface, the grommet head being configured to clamp the mating component in cooperation with the grommet catcher;
a plurality of elongate spaced-apart projections formed on the grommet head that each extend from the cylindrical outer surface of the insertion portion and along each of the first planar inner end face, the tapered slant surface, and the second planar inner end face; and
a release spatial portion constituting a groove-like release space on the cylindrical inner surface of the insertion portion, the release spatial portion being an annular groove that extends radially away from the longitudinal axis and extends about an entire circumference of the cylindrical inner surface, the release spatial portion being configured to serve as a release area for the rubber-like elastic material to move thereinto when the folded grommet catcher elastically deforms inward in a diameter direction; and
a center shaft including
a shaft to be inserted into the through-hole of the insertion portion;
a folded shaft catcher formed on a leading end of the shaft in the insertion direction, the folded shaft catcher includes a tapered insertion surface such that the diameter becomes smaller from a rear end toward a leading end in the insertion direction on an outer circumferential of the leading end of the shaft; and
a shaft head formed on a rear end of the shaft in the insertion direction, the shaft head being configured to clamp the grommet body in cooperation with the shaft catcher.

2. The grommet according to claim 1, further comprising a plurality of communication paths configured to have an inner space released to outside air when the grommet body is mounted on the mating component, the inner space being located inside the plurality of elongate spaced-apart projections.

3. The grommet according to claim 2, wherein
the communication paths are formed between adjacent elongate spaced-apart projections.

4. The grommet according to claim 1, wherein the grommet head is in close contact with the shaft head, the shaft head being secured on a support body that supports the mating component.

5. The grommet according to claim 4, wherein the shaft head is to be embedded in the support body.

6. The grommet according to claim 1, wherein the grommet head is to clamp a support body in cooperation with the shaft head, the support supporting the mating component.

* * * * *